July 23, 1946.  K. L. HERTEL  2,404,708
SAMPLING DEVICE
Filed Aug. 3, 1942
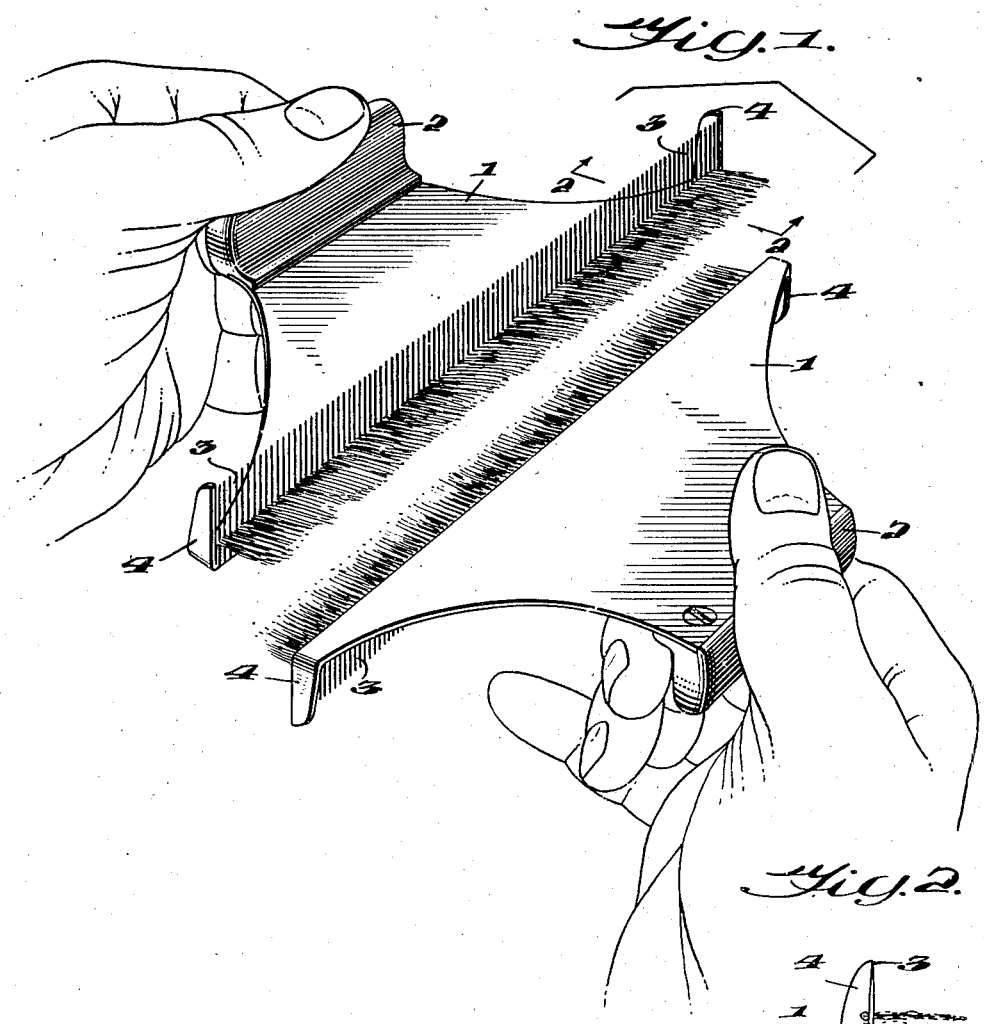
Inventor
Kenneth L. Hertel
By Cyrus Kehr & Suecker
his Attorneys Patented July 23, 1946

2,404,708

UNITED STATES PATENT OFFICE 2,404,708

SAMPLING DEVICE

Kenneth L. Hertel, Knoxville, Tenn., assignor to University of Tennessee Research Corporation, Knoxville, Tenn., a corporation of Tennessee Application August 3, 1942, Serial No. 453,422

4 Claims. (Cl. 19—115)

This invention relates to an improvement in sampling devices for preparing a sample of ginned cotton for measuring the fiber length thereof. This application is a continuation-in-part of my prior application on Cotton fiber measuring instruments, Ser. No. 310,466, filed December 21, 1939, now Patent No. 2,299,983, granted October 27, 1942, which was in turn a continuation-in-part of my prior application, Ser. No. 61,824, filed January 31, 1936.

The length of cotton fibers is one of a number of properties that are of interest to the user of raw cotton. In my aforesaid application, I have set forth the manner of determining the fiber length by the measurement of a representative sample thereof by optical means.

From a theoretical standpoint one would obtain the perfect sample by selecting the fibers at random from a large population using sharp pointed tweezers. In general, a fiber selected would have part of its length extending from one side of the tweezers and the remainder extending from the other side. If now, the fibers are placed perpendicular to a base line with the point of selection on the line and the tweezers oriented in the same fashion each time, one obtains the desired sample. The partial lengths of the fibers extending on one side of the base line, would be statistically like those extending on the other side. In other words, one could fold the sample along the base line to obtain a sample with twice as much fiber but exactly the same in character. This results from the fact that the sample is symmetrical about the base line.

While I have used, in some instances, only one-half of the sample by clamping along the base line, discarding the portions of the fiber below the base line, with both of the devices now set forth in this application, the sample doubles back so that both partial lengths of a fiber may appear in the sample. Regardless of whether the fibers are all doubled back or none of them doubled back, the character of the partial length distribution is the same, the only difference is the thickness or the quantity of the sample. This means, of course, that it is immaterial whether a few of the fibers bend back into the sample or all of the fibers bend back. In practice, some operators have many of the partial lengths bending back while others have only a few of the partial lengths bending back. There is no theoretical reason why this should make a difference and I have found no evidence of a difference.

Furthermore, the fibers are caught at random and the partial lengths serve as a sample. I can determine the length distribution even though only partial lengths are included in the sample. The sample above the base line is exactly like the sample below the base line, on a statistical basis, so that it is necessary to analyze only the partial lengths above the base line; no additional information is obtained by using all of the fiber.

In a large population there are various fiber lengths, resulting in a fiber length distribution. When the fibers are selected with the tweezers or the tooth of the sample comb, as a partial length, there is also a length distribution of these partial lengths of the fibers. The partial lengths have one end at the tooth or teeth and consequently the partial lengths have one end evened up; however, the fiber ends themselves are distributed at random. The curve representing one of these distributions is the integral of the curve representing the other distribution. If the fiber ends are evened up, this results in one curve, whereas, if the partial lengths are evened up, the integral of this curve is obtained.

The sample thus referred to may be prepared by collecting fibers on one or more prongs or teeth, where they are held and combed out in parallel relation, ready for optical analysis. The prong or prongs may be mounted in a suitable clamping device for holding the fibers, or arranged in the form of a comb, the latter being preferable inasmuch as it permits the extending of the sample to a greater lateral area ordinarily. When thus collected on the prong or prongs of the holding device, comb or otherwise, the fibers are combed out in substantially parallel relation and then rearranged to any extent necessary or desirable, thus providing a sample of fairly uniform lateral extent in which the parallel fibers of random lengths will be representative of the total bulk.

I have shown one embodiment of sampling device capable of preparing or holding a sample according to my invention, in the accompanying drawing, in which:

Fig. 1 is a perspective view illustrating the use of combs in preparing a sample; and Fig. 2 is a transverse sectional view through a portion of one of the combs substantially on the line 2—2 of Fig. 1.

In preparing a sample of cotton fibers for optical analysis, the fibers should be collected at random from the mass of ginned cotton and held in side-by-side or parallel relation as they are presented to the analyzing instrument for determination of the fiber length thereof. A measuring instrument may be utilized substantially of the character set forth in my application, Ser. No. 310,466, filed December 21, 1939, now Patent No. 2,299,983, granted October 27, 1942. I have provided a sample holder which may be used not only for presenting the sample for optical analysis, but also in preparing the sample for use in the instrument.

One form of my sample holder is shown in Figs. 1 and 2 comprising a comb or combs which may be used to receive and hold a portion of the total bulk, and when the fibers are combed out, to present them for analysis of the fiber length, as representative of the total bulk. By using a pair of combs, as illustrated, two samples are thus provided, and one may be used to comb out the fibers of the others, while collecting thereon a representative sample.

In the form shown, each of the combs comprises a back designated generally by the numeral 1, which is formed as a flat plate having a handle 2 secured thereto at the outer end of said plate. The inner end of the plate is offset substantially at right angles thereto and is slit to form a row of teeth 3 extending transversely of the plate and upstanding therefrom substantially at right angles thereto. Arms 4 are formed on the plate at opposite ends of the row of teeth, so as to space accurately the row of teeth a definite distance from the sample holder and the optical slit in the measuring instrument.

In preparing a sample on a comb, the operator should collect on the teeth thereof a mass of cotton from the total bulk to be analyzed. This may be done by holding the comb with one hand and then picking up random bits of cotton from the mass with the other hand and applying these bits onto the teeth of the comb along the length of the row of teeth until some cotton has been applied thereto substantially throughout the length of the comb, or the desired portion thereof. Then the other comb of the pair should be inverted relative to the first comb, as shown in Fig. 1, and used to comb out the cotton thus collected on the first comb.

This may be done by moving the row of teeth of the second comb through the mass of cotton collected on the first comb in a direction lengthwise of the teeth, on the outer side of the row, and then away from the first comb at right angles to the teeth. This will tend to straighten out the fibers of the sample substantially into parallel relation, and it will also draw them out until substantially the entire length of each fiber projects from the comb, although it may be doubled around the teeth or entangled in the mass behind the teeth, as shown in Fig. 2. This combing action serves also to transfer some of the fibers from the first comb to the second comb, due to the slippage of the fibers through the teeth, where they are likewise caught and combed out by the interengaging action of the combs, one with the other.

This combing action may be repeated several times until samples remain on both combs, in each of which the fibers are substantially in parallel side-by-side relation and project from the outer sides of the combs, representative of the fiber length of the total bulk to be analyzed.

Any dirt that may have remained in the bulk cotton will be caught behind the comb in the relatively small mass remaining there, so as not to interfere with the optical analysis of the cotton in the sample.

After thus preparing one or more samples and combing out the fibers, these may be analyzed optically in the manner set forth in my above-mentioned application. The mechanism may be constructed to analyze both samples thus prepared on the representative combs or these may be analyzed separately as desired. The handles 2 serve not only to handle the combs during the preparation of the samples, but are also constructed so as to facilitate securing of the combs in the analyzing mechanism.

I claim:

1. A sample holder comprising a flat plate formed of sheet metal having a laterally turned edge thereon, a row of prongs secured to said edge forming teeth thereon, means at opposite sides of said plate forming integral down-turned flanges at opposite ends of the row of teeth embracing the row of teeth therebetween and forming arms on the plate, each of said arms being of greater length and width than the teeth therebetween, and means secured to the plate at the opposite edge thereof and projecting therefrom in the same direction as the teeth forming a handle therefor.

2. A sample holder comprising a flat plate formed of sheet material having a row of prongs secured to an edge thereof forming teeth thereon, means at opposite ends of the said plate forming integral down-turned flanges at opposite ends of the row of teeth embracing the row of teeth therebetween and forming arms on the plate, each of said arms being of greater length and width than the teeth therebetween, and means secured to the plate at the opposite edge thereof from the teeth forming a handle therefor.

3. A process of preparing a sample of fibers for analysis comprising clamping a mass of fibers loosely on the teeth of a comb, engaging the fibers outwardly of the teeth of the comb with a second comb and drawing the second comb outwardly through the fibers combing the fibers substantially into parallel relation, the combing action imposing a sufficient drag on the fibers by the teeth of the first comb as to retain a substantial mass of fibers thereon while allowing slippage of the fibers into relative random positions.

4. A process of preparing a sample of fibers for analysis comprising collecting a mass of fibers on a comb, drawing a second comb through the fibers on the first comb and outwardly therefrom thereby transferring some of the fibers from the first comb to the second comb, and continuing to engage each of the combs with the fibers on the other comb at the same time, and moving the combs laterally outwardly from each other combing the fibers on the respective combs into parallel relationship and positioning the fibers at random in each comb.

KENNETH L. HERTEL.